United States Patent [19]

Squirrell

[11] Patent Number: 5,329,970
[45] Date of Patent: Jul. 19, 1994

[54] DIVERTER VALVES

[75] Inventor: Anton F. Squirrell, Mellingen, Switzerland

[73] Assignee: WES Technology Inc., Santa Ana, Calif.

[21] Appl. No.: 27,170

[22] PCT Filed: Sep. 16, 1991

[86] PCT No.: PCT/GB91/01585
§ 371 Date: Mar. 16, 1993
§ 102(e) Date: Mar. 16, 1993

[87] PCT Pub. No.: WO92/05380
PCT Pub. Date: Apr. 2, 1992

[30] Foreign Application Priority Data

Sep. 17, 1990 [GB] United Kingdom ............... 9020297

[51] Int. Cl.$^5$ ............................................. F16K 11/02
[52] U.S. Cl. ................................. 137/625.44; 137/875; 251/120
[58] Field of Search ............... 137/625.28, 625.31, 137/625.32, 625.44, 625.45, 875, 876; 251/120

[56] References Cited

U.S. PATENT DOCUMENTS

| 3,270,775 | 9/1966 | Alderson | 137/625.44 |
| 4,342,333 | 8/1982 | Mizuno | 137/625.44 |
| 4,342,528 | 10/1982 | McAndrew | 137/875 |
| 4,351,361 | 9/1982 | Worley | 137/625.44 |
| 4,573,551 | 3/1986 | Schwerdtner et al. | 181/218 |
| 4,597,415 | 7/1986 | Gieseke | 137/875 |

FOREIGN PATENT DOCUMENTS

| 0087643 | 9/1983 | European Pat. Off. |
| 2304838 | 10/1976 | France |
| 901538 | 7/1962 | United Kingdom | 137/875 |

Primary Examiner—Robert G. Nilson
Attorney, Agent, or Firm—Gottlieb, Rackman & Reisman

[57] ABSTRACT

A diverter valve (10) provided at a three-way junction through which passes a high temperature gas, the valve having a closure member (12, 13, 14) pivotable between a first position in which it closes a first outlet branch of the junction and a second position in which it closes a second outlet branch of the junction, wherein the closure member carries one or more deflecting vanes (16) positioned (a) in front of the closure member so as to direct the flow of gas into and through the first outlet branch when the closure member closes the second outlet branch and (b) to be hidden behind the closure member and to be isolated from contact with the gas flowing into and through the second outlet branch when the closure member closes the first outlet branch.

4 Claims, 3 Drawing Sheets

DIVERTER VALVES

This invention relates to diverter valves, particularly diverter valves provided at a three-way junction through which passes a gas at a sufficiently high temperature for it to be practical or desirable to extract heat from the gas exhaust. More specifically the invention relates to diverter valves used in exhaust systems of a gas turbine combined cycle generating plant or co-generation plant or other plant where by-pass arrangements exist, to minimize the back pressure loss and hence improve the cycle efficiency.

Gas turbines are frequently used to drive rotating machinery such as compressors, pumps and electric generators. Thermodynamically the gas turbine is a relatively inefficient prime mover, because, although the inlet temperature of the working fluid is high, the reject temperature is also relatively high and much high grade heat is lost. However, it is now common practice to couple a simple cycle gas turbine with a heat recovery steam generator (HRSG) or other heat exchanger to extract more heat from the working fluid to provide superheated steam for a steam turbine in combined cycle plant, or saturated steam for some process, or both, in cogeneration systems.

In the exhaust ducting systems following the gas turbine discharge, gas flow velocities are maintained at relatively high levels to reduce the size of ducting and silencers and to promote high rates of heat transfer in the heat recovery equipment. With these high velocities, pressure drops in the exhaust system can be considerable, and these pressure drops increase the back pressure which reduces the power output of the turbine. This back pressure may have substantial economic implications as an increase in turbine back pressure of 100 mm $H_2O$ can reduce the power output by 1%.

Diverter valves or isolating dampers are invariably fitted in the exhaust system where heat recovery equipment is installed, to perform the following functions:
(1) to provide isolation capability for the heat recovery steam generator to enable maintenance to be carried out while the turbine operates on simple cycle, i.e. discharging through the by-pass without any heat recovery from the working fluid;
(2) to minimize the heat loss to the by-pass when the heat recovery system is in operation;
(3) to provide flow control for start up, shut down and part load operation.

These diverter valves or dampers are often situated at or adjacent to points in the system where T-junctions occur, typically at HRSG inlet and by-pass locations. These T-junctions cause high pressure drops, of the order of 115% of velocity pressure when the flow of gas is directed around a sharp bend. Depending on the plant layout, the flow through the bend may occur either when the plant operates on by-pass or on heat recovery mode.

Turning or deflecting vanes, or splitters, which are frequently fitted to sharp bends in ducting systems to reduce the pressure drop to about 35% of velocity pressure, cannot be fitted in the ducting at a T-junction because they would obstruct the flow when it is directed in the straight through mode.

Although most plants with waste heat recovery systems will be normally expected to operate with the by-pass closed, it can be that a plant may operate for extended periods through the by-pass, perhaps because the plant operates initially on simple cycle while construction of the heat recovery equipment proceeds, or because of reduced load demand or for maintenance of the heat recovery equipment. It is therefore apparent that, even when the bend in the flow direction is to the by-pass, considerable economic savings may be made by providing equipment which causes the inherent pressure loss of the bend to be reduced.

The diverter valves or isolating dampers provided at the various locations were formerly typically of the following types:

| | |
|---|---|
| (1) HRSG Inlet | Guillotine |
| | Louvre |
| | Flap |
| (2) By-Pass | Louvre |
| | Flap |
| (3) HRSG Outlet | (where fitted) |
| | Guillotine |
| | Louvre |
| | Flap |

All these types when fitted adjacent to T-junctions do not provide any means of minimizing the pressure drop at the T-junctions.

There is thus a need for a diverter valve which can be fitted at such T-junctions and which has a capability to minimize the pressure drop when the gas flow is directed around the bend.

It is now considered the state of the art to install diverter valves in gas turbine combined cycle or cogeneration plants. Their function is as follows:
a) To isolate the heat recovery steam generator (HRSG) for gas turbine start up;
b) To control the flow of exhaust gas to the HRSG for change over to combined cycle mode operation;
c) To allow HRSG inspection and maintenance whilst in simple cycle mode operation;
d) To facilitate phased construction/operation of the plant, i.e. it is normal for the gas turbine to run in simple cycle mode whilst the HRSG and steam turbine are being constructed.

In arrangements with louvre or flap dampers and also with current diverter valve configurations, by pass operation involves turning the flow through 90 degrees using a sharp bend, resulting typically in a pressure loss of 1.15 times the velocity pressure. This causes a reduction in the power output and efficiency and results in turbulence which can lead to vibration problems in the plenum or in adjacent ducting. No turning vanes are possible because they would interupt the flow to the HRSG for combined cycle operation.

The present invention provides a diverter valve provided at a three-way junction through which passes a high temperature gas, the valve having a closure member pivotable between a first position wherein it closes first outlet branch of the junction and a second position wherein it closes the second outlet branch of the junction, wherein the closure member carries one or more turning or deflecting vanes in such a manner that it is or they are positioned in front of the closure member to direct the flow of gas through the first outlet branch when the closure member closes the outlet branch, and behind the closure member and out of contact with the flowing gas entering the second outlet branch when the closure member closes the first branch.

In the present invention turning vanes are mounted on the diverter valve blade in such a way that for simple cycle operation the turning vanes effectively reduce bend losses. In the most common applications, the valve position for combined cycle operation is such that the turning vanes retract into the space above the diverter valve blade.

Typically, but not necessarily, four turning vanes would be used. The vanes are suitably mounted on a structure cantilevered out from the main blade of the diverter valve.

The diverter valve according to the invention is particularly intended for use in a T-junction through which flows high temperature exhaust gas from a gas turbine, one junction outlet leading to a by-pass stack and the other junction outlet leading to a heat recovery steam generator or other heat exchanger. However, it will be appreciated that the present invention is not limited to such applications, and that diverter valves according to the invention may be provided at any three-way junction through which there passes a gas at a sufficiently high temperature for it to be practical or desirable to extract heat from the gas for exhaust.

The diverter valve according to the invention is able to perform HRSG inlet and isolation functions in one piece of equipment, and the turning or deflecting vanes fitted to the closure member reduce the pressure loss when the gas flow is diverted through a bend, typically but not necessarily 90°. When the gas flow is straight the turning vanes are moved into the isolated space behind the closure member.

The diverter valve may suitably comprise a frame fixed across the two outlet ducts of a three-way junction, the frame having two sets of sealing surfaces one in each outlet path, and a closure member comprising a pivotable flap carrying two sets of seals for respectively co-operating with the sealing surfaces of the frame. The flap is suitably operated by turning a shaft to which the flap is attached. This arrangement ensures that the flap cannot be closed to both flow directions at the same time, so that the system is inherently safe.

The invention will be further described, by way of example only, with reference to the accompanying drawings, in which.

Figure 1:
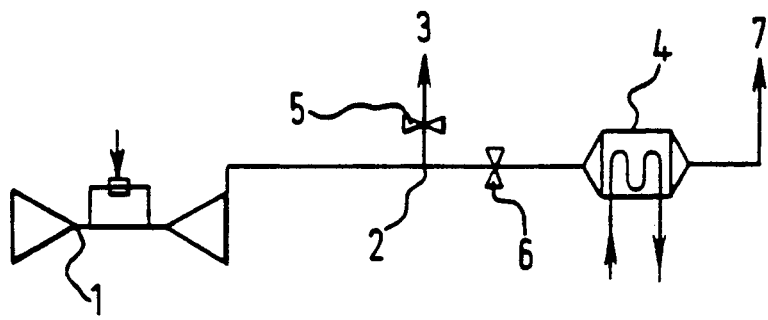
FIGS. 1 to 3 are schematic views illustrating typical gas turbine cycle layouts.
Figure 3:
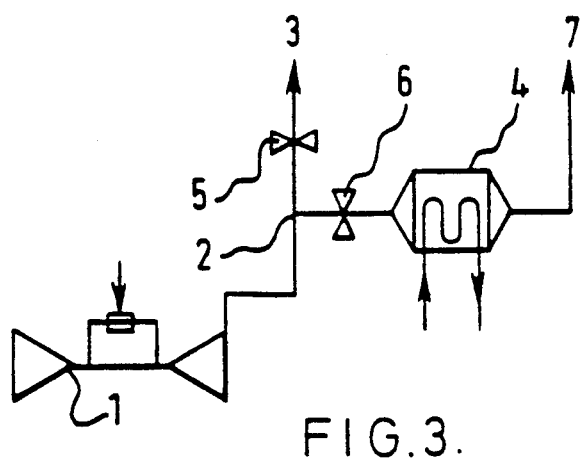

In each of the gas turbine cycle layouts shown in FIGS. 1 and 3, a gas turbine 1 provides a drive for some piece of plant such as a compressor, pump or electric generator (not shown). The exhaust gas from the turbine 1 passes to a T-junction 2 wherein one outlet of the junction leads to a by-pass stack 3 while the other junction outlet leads to a heat recovery- steam generator 4 (HRSG). In each of the arrangements shown in FIGS. 1 and 3, which do not include diverter valves according to the invention, the outlet leading to the by-pass stack incorporates an isolating valve 5 while the outlet leading to the heat recovery steam generator incorporates an isolating valve 6. The heat extracted from the heat recovery steam generator is used to provide superheated steam for a steam turbine or saturated steam for some process or both. Alternatively some other form of heat exchanger may be used to extract heat from the turbine exhaust gas.

Figure 2:
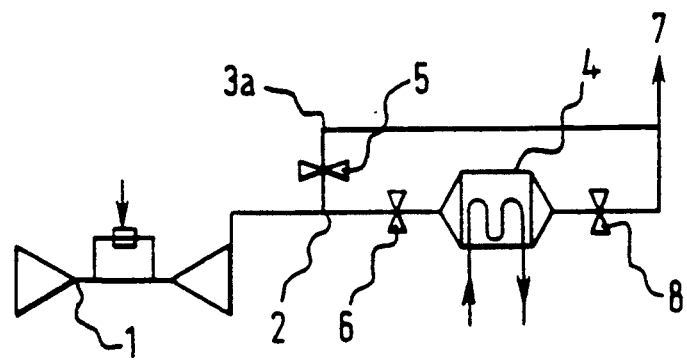

The arrangement shown in FIG. 3 differs from that shown in FIG. 1 in that in FIG. 3 the through flow at the junction 2 from the turbine 1 is to the by-pass stack, whereas in FIG. 1 the through flow at the junction 2 is to the heat recovery steam generator. The arrangement shown in FIG. 2 is generally similar to that shown in FIGS. 1 and 3 except that the by-pass stack 3 is replaced by a by-pass 3a leading to the main stack 7; in this case an isolating valve 8 is provided at the heat recovery steam generator outlet.

As previously described, when the gas flow is to be diverted through typically but not necessarily 90° at the junction 2 the pressure drop can be considerable, and the pressure drop increases the back pressure which reduces the power output of the turbine 1. We have now found that such back pressure can be minimized by replacing the valves 5 and 6 with a single diverter valve according to the invention at the junction 2.

Figure 4:
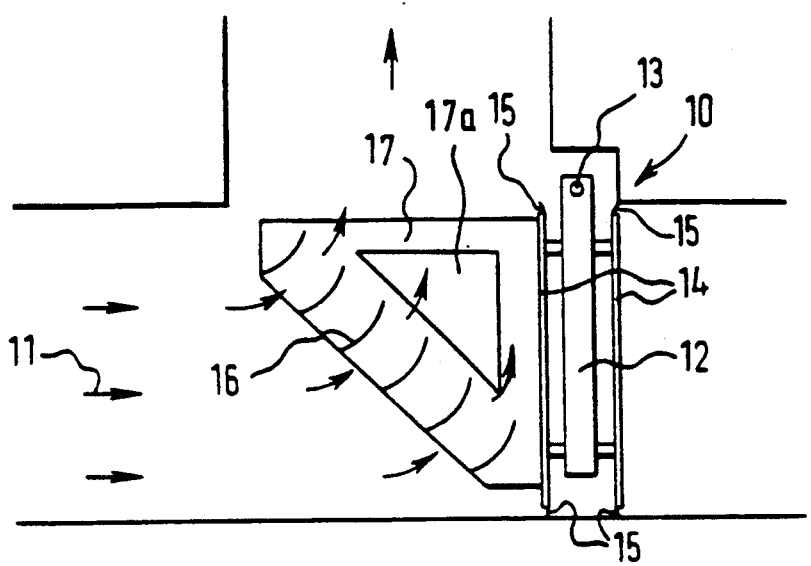
FIG. 4 is a schematic view of a diverter valve according to the invention fitted in a T-junction, the closure member of the valve being shown in the position wherein gas is deflected through one outlet of the junction.
Figure 5:
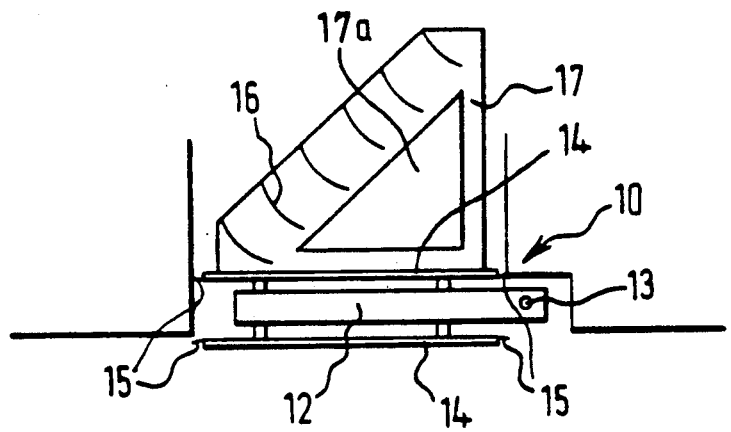
FIG. 5 is a view similar to FIG. 4 but wherein the closure member of the valve is in the position wherein gas passes through the other outlet of the junction.

A preferred embodiment of a diverter valve 10 according to the invention is shown in FIGS. 4 and 5. As shown in FIG. 4, the high temperature exhaust gas flow from a gas turbine is shown by arrows 11. The diverter valve 10 comprises on the one hand a flap arm 12 which is pivotably mounted at 13 to be movable between the positions shown in FIGS. 4 and 5, the flap arm 12 carrying on its opposite faces a pair of sealing blades 14 each provided with peripheral seals 15, preferably of the type described in British Patent No. GB-A-1308801 or GB-A-2060824 or in PCT application no. WO 90/06460 or WO 90/02279. The diverter valve further comprises a suitable frame arranged around the peripheries of the two outlet ducts of the junction in which the diverter valve is mounted. The frame is provided with two sets of sealing surfaces, i.e. one set of sealing surfaces being associated with each outlet duct, the sealing surfaces of the frame being adapted to co-operate with the seals 15.

In accordance with the invention the diverter valve carries a series of curved turning or deflecting vanes 16 attached to side plates 17 provided with lightening holes 17a, which side plates are in turn attached to one of the sealing blades 14. When the diverter valve is in the position shown in FIG. 4, for example for effecting flow to a by-pass stack, the turning vanes 16 are positioned in front of the closure member and function to assist the gas flow and direct it into the appropriate outlet branch of the function. When on the other hand the diverter valve is in the position shown in FIG. 5, for example for permitting through flow to a heat recovery steam generator, the turning vanes 16 are located behind the closure member and are entirely isolated and withdrawn from the gas flow path.

Thus when the diverter valve operates in the by-pass mode (assumed in this instance to turn through the 90° bend), the turning vanes 16 facilitate the gas flow to an extent sufficient to reduce the back pressure on the gas turbine and hence limit the reduction of the turbine efficiency.

The turning vanes 16 most suitably consist of a series of curved plates, which may be of single or double skin construction, arranged radially out from the inside corner of the bend of the three-way junction to the outside in their operating position. These vanes are as close to the full duct width as possible and are mounted on the flap of the flap type diverter valve so that they move when the flap is moved.

Figure 6A:
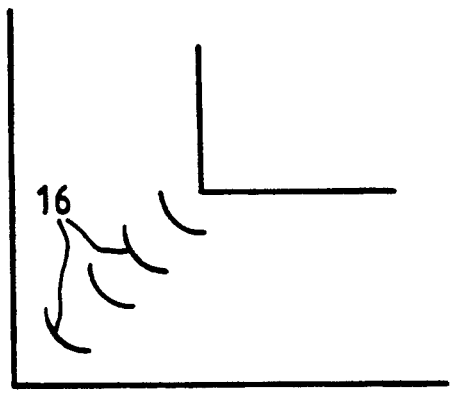
FIG. 6a is a schematic view of one embodiment of a diverter valve of the invention, wherein the turning vanes thereof are of thin sheet.
Figure 6B:
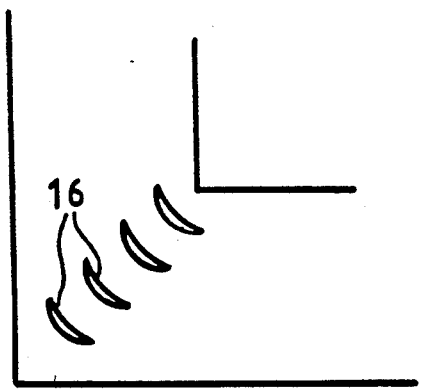
FIG. 6b is a schematic view of another embodiment of a diverter valve of the invention, wherein the turning vanes thereof are of general aerofoil type section.
Figure 6C:
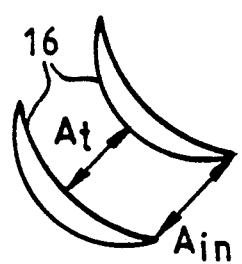
FIG. 6c is an enlarged view of adjacent turning vanes of the type as shown in FIG. 6b.

These vanes 16 may suitably be of two types.

a) They may be of thin sheet spanning the mitre of the bend, as shown in FIG. 6a of the drawings, in which case the pressure loss may be of the order of 0.3 times the velocity pressure. These give good results when the inlet flow is well developed.

b) In cases where the inlet flow is poorly distributed, a combination flow conditioning system and turning vane can be used. These vanes are of a generally aerofoil type section, as shown in FIG. 6b of the drawings, and are characterised by having a throat area $A_t$ less than the inlet area $A_{in}$ thereof as shown in FIG. 6c. These can result in the pressure loss being as low as 0.12 times the velocity pressure.

It will be appreciated that, in FIGS. 6a, 6b and 6c, the structure carrying the turning vanes 16 has been omitted for reasons of clarity.

Thus there is provided a diverter valve fitted in a three-way junction and having turning vanes attached thereto to reduce the pressure drop when the gas flow is being directed through an angle, typically but not necessarily 90°. Such a diverter valve provides inherent safety by ensuring that both outlet flow paths cannot be closed simultaneously.

The diverter valve according to the invention may optionally incorporate a multi-flap structure.

I claim:

1. A diverter valve provided at a three-way junction between an inlet passageway and first and second outlet branches therefrom and through which junction passes a high temperature gas, the valve having a closure member pivotable between a first position wherein it closes said first outlet branch of the junction while leaving said second outlet branch open and a second position wherein it closes said second outlet branch of the junction while leaving said first outlet branch open; wherein the improvement comprises that:

said closure member at one side thereof carries one or more deflecting vanes, said deflecting vane or vanes being located with respect to said closure member (a) such that when the latter closes said second outlet branch, said vane or vanes is or are positioned in front of said closure member so as to serve to direct the flow of said gas from said inlet passageway into and through said first outlet branch, and (b) such that when said closure member closes said first outlet branch, said vane or vanes is or are positioned behind said closure member so as to remain entirely out of contact with the gas flowing from said inlet passageway into and through said second outlet branch.

2. A diverter valve as claimed in claim 1, wherein the improvement further comprises that:

a frame is fixed across said first and second outlet branches of said three-way junction, said frame providing first and second sets of sealing surfaces within said junction at the entrances to said first and second outlet branches, respectively, and said closure member comprises a pivotable flap carrying first and second sets of seals for respectively co-operating with said first and second sealing surfaces of said frame.

3. A diverter valve as claimed in claim 1 or 2, wherein said or each deflecting vane is a curved plate.

4. A diverter valve as claimed in claim 3, wherein said or each deflecting vane has a generally aerofoil type section.

* * * * *